United States Patent [19]
Lin

[11] Patent Number: 6,023,349
[45] Date of Patent: Feb. 8, 2000

[54] APPARATUS FOR SCANNING

[75] Inventor: John Lin, Hsinchu, Taiwan

[73] Assignee: Mustek Systems, Inc., Hsinchu, Taiwan

[21] Appl. No.: 08/898,601

[22] Filed: Jul. 23, 1997

[51] Int. Cl.⁷ .............................. H04N 1/04; G03B 27/10
[52] U.S. Cl. ............................................ 358/497; 355/130
[58] Field of Search ..................... 358/474, 471,
358/482, 483, 487, 488, 494, 496, 500,
506, 401, 486, 492, 497; 355/308, 47–50,
81–84, 127–130, 131

[56] References Cited

U.S. PATENT DOCUMENTS

| | | | |
|---|---|---|---|
| 1,144,014 | 6/1915 | Westman . | |
| 1,466,696 | 9/1923 | Brack . | |
| 2,749,821 | 6/1956 | Tien | 95/77.5 |
| 3,588,244 | 6/1971 | Murgas | 355/8 |
| 3,851,969 | 12/1974 | Haus | 355/132 |
| 4,157,222 | 6/1979 | Ishihara | 355/75 |
| 4,849,793 | 7/1989 | Someya | 355/75 |
| 5,022,170 | 6/1991 | House | 40/358 |
| 5,070,358 | 12/1991 | Stouffler et al. | 355/20 |
| 5,736,734 | 4/1998 | Marcus | 250/225 |
| 5,814,809 | 9/1998 | Han | 358/474 |

*Primary Examiner*—Jerome Grant, II
*Attorney, Agent, or Firm*—Pennie & Edmonds LLP

[57] ABSTRACT

The present invention includes a housing for providing space to hold elements of the scanning system, a document holder is used for holding a document, which can be separated from the scanning system. Further, the document holder includes a transparent plate and a document cover. The document cover includes a memory alloy for covering a document and a rotatable rod. A plate having an opening for feeding the document holder into the scanning system. An image capturing device is set in the scanning system for capturing the image of the document. A pair of tracks are formed in the housing for holding the document holder.

18 Claims, 3 Drawing Sheets

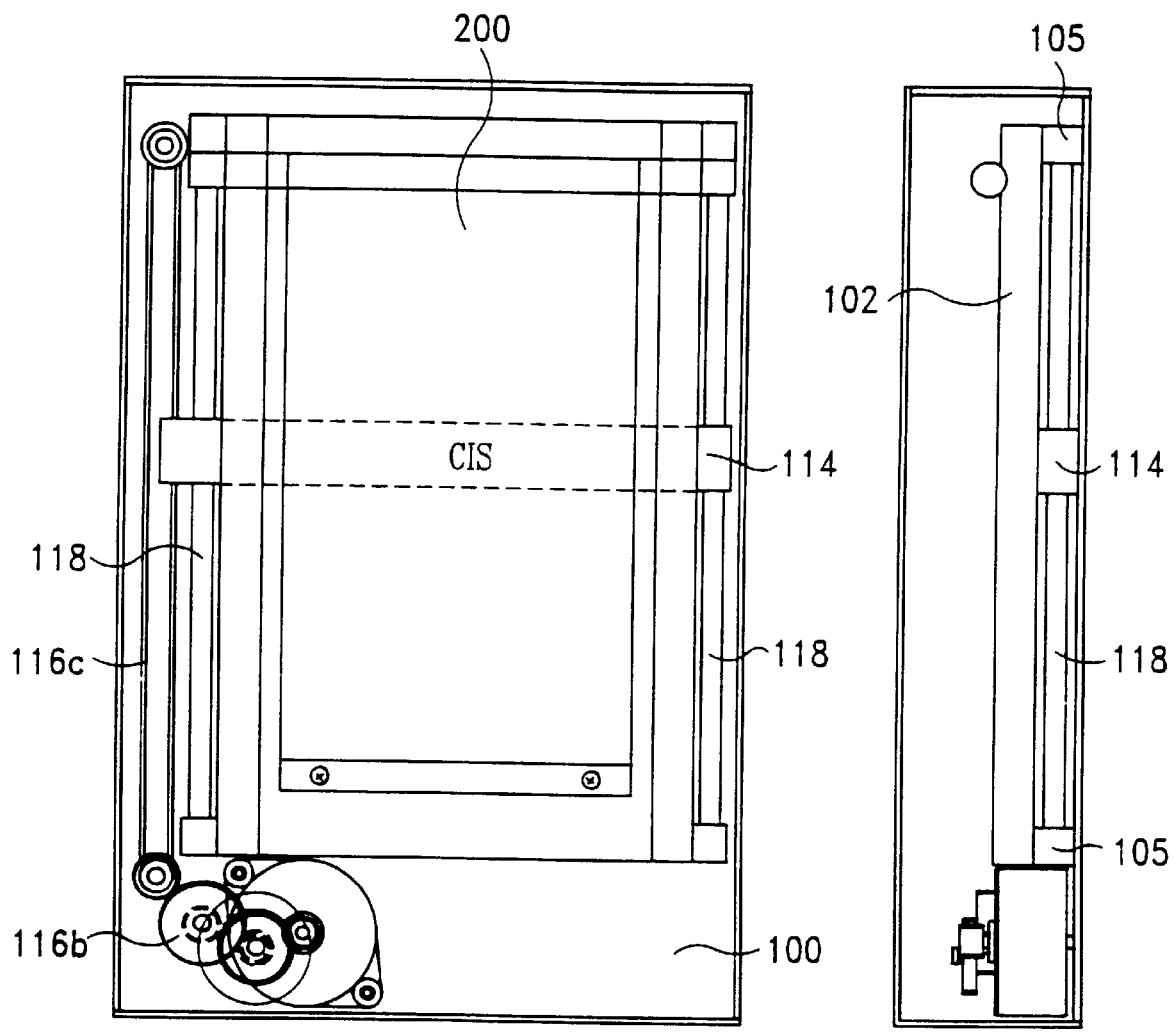
FIG.2A
FIG.2C
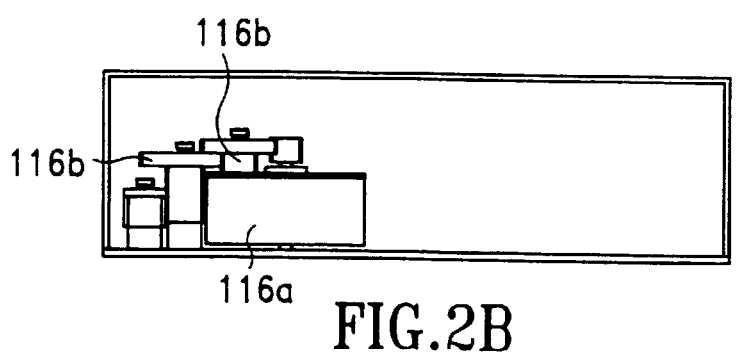
FIG.2B

APPARATUS FOR SCANNING

FIELD OF THE INVENTION

The present invention relates to a scanning system, and more specifically, to a scanning system that can be built in a computer.

BACKGROUND OF THE INVENTION

Conventional scanning system can be approximately divided into two segments that are handy scanning system and flat-bed scanning system. A conventional scanning system apparatus includes a light source, a mirror, and a lens set, which are used to guide the reflecting light to a charge couple device (CCD). The charge couple device is utilized to generate an image signal. A pre-processing element is used to respone an image signal and adjust dc gain of the image signal. An analogue to digital converter is used to convert adjusted image signal to a digital signal and a post-processing element to generate an image code by processing said digital signal through highlight, shadow, and Gamma correction. In practicing the scanning system, the light source is reflected from the surface of a document, then it is reflected against from the mirror and focused by a lens set. The mirror and the lens set are used to guide the light beam to a CCD.

Subsequently, the light beam is converted to an image signal by the CCD, and direct current (d.c.) gain of the image signal is adjusted by a pre-processing element, i.e. a d.c. gain voltage amplifier. Then the adjusted image is fed to an analogue to digital converter (ADC) for converting adjusted image signal to a digital signal. The digital signal is fed to a post-processing element to generate an image code by processing the digital signal through highlight, shading correction, and Gamma correction.

However, in conventional scanning apparatus, the document is fed into the scanning apparatus by using rollers, which will cause damage of the document. Therefore, the output quality of the scanning system can not meet the requirement of the present demand. Further, the cost of the conventional scanning apparatus that is built in a computer is high and the structure of the apparatus is also complicated.

SUMMARY OF THE INVENTION

It is an object of the present invention to provide a scanning apparatus that can be built in a computer.

It is an another object of the present invention to provide a scanning apparatus having a document holder for holding a document, a portion of the document holder can be separated from the scanning apparatus.

The scanning system includes a base housing for providing space to hold elements and circuits of the scanning system. A pair of tracks are respectively formed over on the base housing to hold a document holder. A plate having an opening is connected to the base housing. An image capturing device is set in the scanning system. The document holder includes a transparent plate and a document cover. The document cover includes a memory alloy for covering a document and a rotatable rod. One end of the memory alloy is fixed on the transparent plate by using a plurality of fixers. Another end of the memory alloy is adhered on the ratatable rod. The transparent plate is made of glass or acrylic resin.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2A is a schematic drawing of an overhead view of the present invention.

FIG. 2B is a schematic drawing of a right side view of the present invention.

FIG. 2C is a schematic drawing of a cross section view of the present invention.

DESCRIPTION OF THE PREFERRED EMBODIMENT

The present invention discloses a scanning system that has a document holder for holding a document. Further, a portion of the document holder can be separated from the scanning system, and the present invention can be built in a computer. Preferably, the scanning system can be set in the space of a computer where used to set a floppy disk driver or a CD driver.

Figure 1:
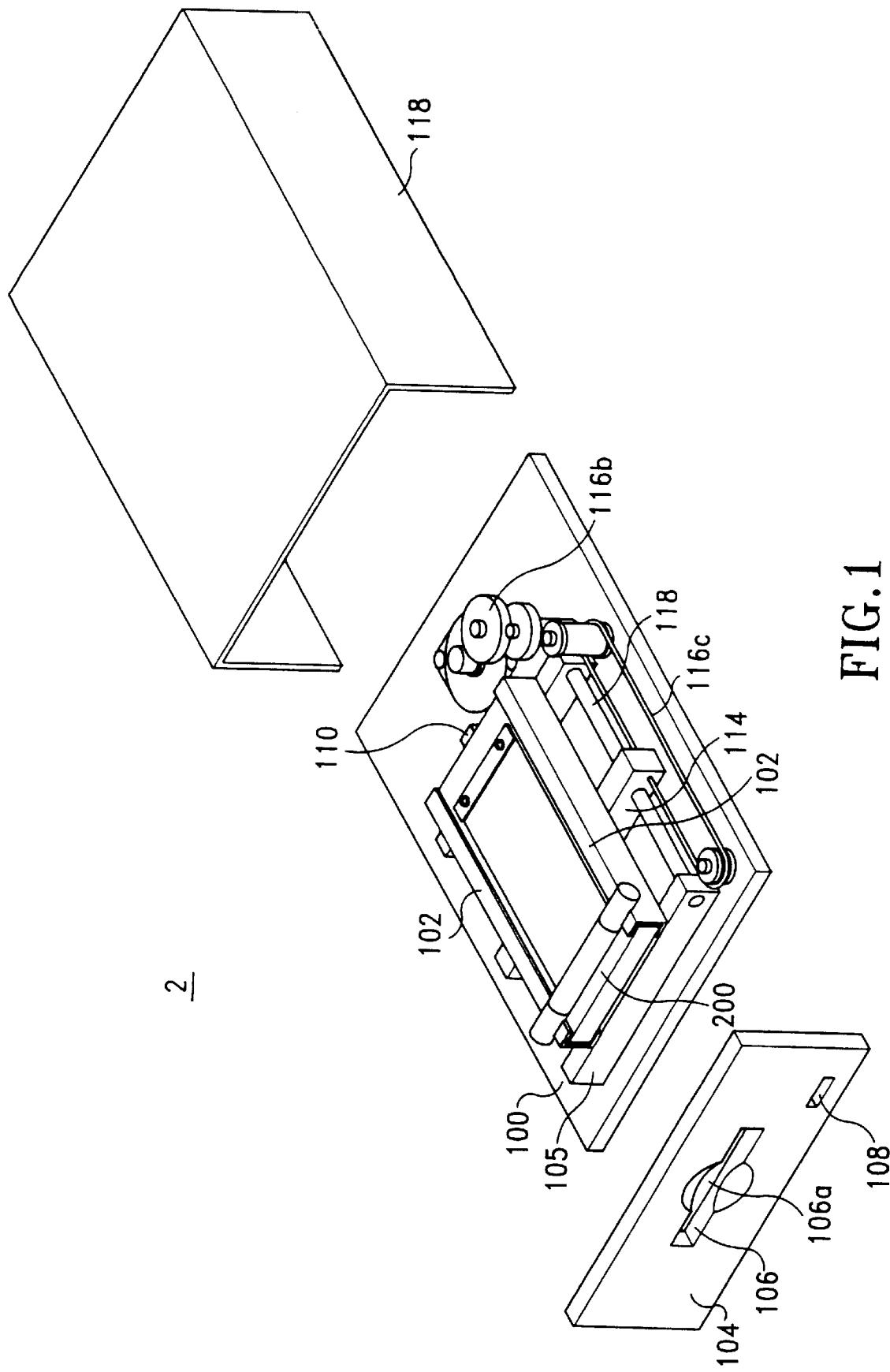
FIG. 1 is a schematic drawing of the present invention.

Turning to FIG. 1, the scanning system 2 includes a housing consisting of a base 100 and a top cover 118 for providing space to hold elements of the scanning system 2. A pair of tracks 102 are respectively set on the base 100 via supporters 105 to hold a document holder 200 and provide an orbit for the document holder 200, therefore the document holder 200 can be linearly moved along the tracks 102 back and forth. A plate 104 having an opening 106 is connected to and located forehead of the base 100. The opening 106 is used to provide a path for feeding a document into the scanning system 2.

Still referring to FIG. 1, a rejecting button 108 is formed on the plate 104. A rejecting element (not shown) is responsive to the rejecting button 108 to reject the document holder 200 out of the scanning system 2. The rejecting element is well known in the art. In practicing the rejection mode, the rejecting button 108 is pushed by an operator. The rejecting means 110 is responsive to the rejecting button 108 to force the document holder 200 out of the scanning system 2. It should be note that the present invention can work without the rejecting button 108 and the rejecting element 110. For example, a hook 110 can replace the function of the rejecting element 110. Only if the operator pulls the document holder 200 out of the system by a hand via indented portion 106a of the opening 106. The hook 110 is used for fixing the document holder 200 while the document holder 100 is fed into the scanning system 2. And the hook 110 is used to make sure the document holder 200 will not be moved during the scanning. Further, a top cover 118 is used to cover the elements and attached on the base 100 of the scanning system 2.

FIGS. 2A, 2B and 2C are schematic drawings of an overhead view, a right side view, a cross section view according to the present invention, respectively. Turning now to FIG. 1, FIGS. 2A, 2B 2C, an image capturing device 114 is set in the scanning system 2. Typically, the image capturing device 114 passes along the surface of the document from one end to another end and a complete image of the document linear segments individually captured by the image capturing device 114. The image capturing device 114 is perferably set under the document holder 200. In preferred embodiment, the images capturing device 114 is driven by driving means. The driving means includes a stepping motor 116a, a gear set 116b and a wire or timing belt 116c. The power of the stepping motor 116a is transmitted from the gear set 116b, wire 116c to the images capturing device 114. The images capturing device 114 can be driven by the driving means to move back and forth along transmission means, such as a pair of parallel shafts 118. The pair of the shafts 118 are set between the supports 105. Preferably, a contact image sensor (CIS) serves the image capture device 114. Alternatively, a charge couple device (CCD) can also be used to act the image capture device 114. A lens set, a mirror and a light source are also need for the arrangement. The advantage of using the CIS is that the optical path of the CIS is shorter than the one of the CCD. Further, the space where is occupied by the CIS is smaller than that of the CCD. Therefore, the CIS has the advantage for scaling down the size of the scanning system.

Figure 3A:
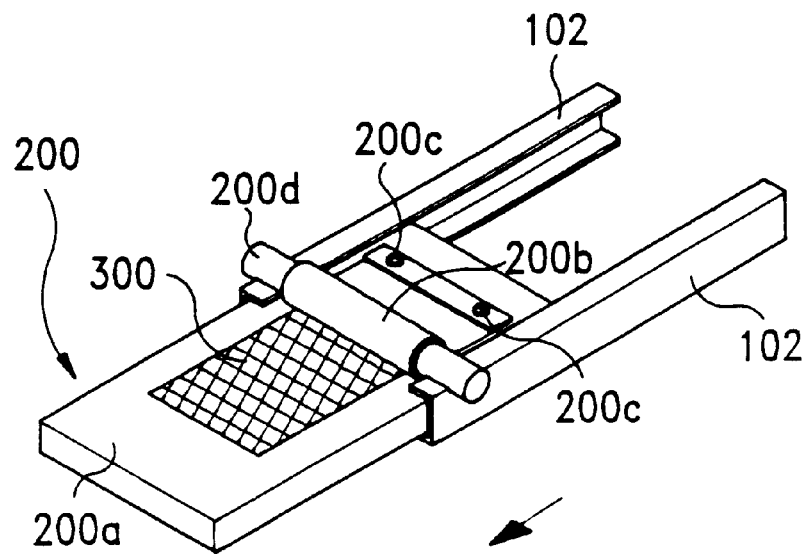
FIGS. 3A and 3B are schematic drawings of a document holder of the present invention.

Turning to FIGS. 3A and B, they are schematic drawings of the document holder 200 according to the present invention. The document holder 200 includes a transparent plate 200a and a document cover. In a case, the document cover includes a memory alloy 200b for covering a document 300 and a rotatable rod 200d. One end of the memory alloy 200b is fixed on the transparent plate 200a by using a plurality of fixers 200c. Another end of the memory alloy 200b is adhered on the rotatable rod 200d. The transparent plate is made of glass or acrylic resin. Alternatively, plastic slice, such as material for making camera film, may be used to replace the shape memory alloy.

Figure 3B:
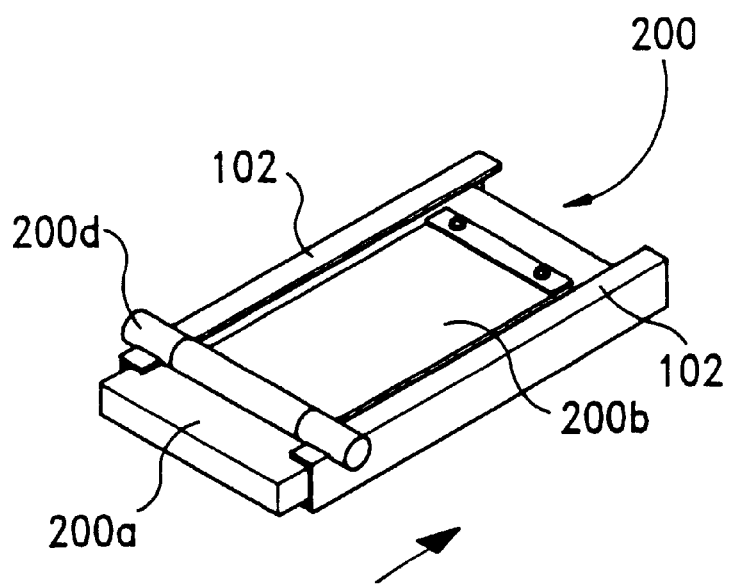

In practicing the scanning system, the document 300 is place onto the surface of the transparent plate 200a. In addition, the surface of the document that has pattern is attached on the surface of the transparent plate 200a. As shown in FIG. 3B, the document holder 200 is fed into the scanning system 2 in the direction indicated by an arrow. Under this arrangement, the memory alloy is extended by an external force and the document 300 is covered by the memory alloy 200b, therefore, the document is place on the transparent plate 200a flatly. A sensor is set in the cassette scanning system 2 to detect the document 206 is in the scanning system 2 or not. If the sensor detects the document is in the scanning system. Subsequently, the scanning system 2 is responsive to the sensor to start the scanning status. The image capturing device 114 is driven by a stepping motor 116a to capture the image of the document 300. The image capturing device 114 is not only to capture the image but also converts the captured image to an image signal. Subsequently, an image code is generated by a pre-processing element, an analogue to digital converter, and a post-processing element. Then the image code is output to a monitor or an output element and so on. In addition, the present invention can also be electrically connected to a computer via a cable.

Turning to FIG. 3A, a portion of the document holder 200 can be separated from the scanning system. When the document holder 200a moves out of the scanning system via the opening 106 in the directions indicated by an arrow, the memory alloy 200b is scrolled on the rotatable rod 200d. It is the state when the memory alloy 200b is not acted by an external force.

The foregoing description of the present invention has been presented for purposes of illustration and description. As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. An apparatus for scanning, said apparatus comprising:

a housing for providing space for holding elements of said apparatus;

a document holder having document covering means, a transparent plate for holding a document, wherein said document covering means includes a rotatable rod set in said housing, and a cover for covering said document, one end of said cover being fixed on said transparent plate, another end of said cover being adhered on said rotatable rod, said cover being movable between a retracted position in which the cover is wound around the rotatable rod, and a deployed position wherein the cover is unwound from around said rotatable rod; and means for capturing set in said apparatus for capturing the image of said document.

2. The apparatus of claim 1, further comprising:

driving means for driving said image capturing means to move back and forth.

3. The apparatus of claim 1, further comprising:

a pair of tracks respectively formed on said housing for holding said document holder and providing an orbit such that said document holder linearly moving along said tracks back and forth.

4. The apparatus of claim 1, further comprising:

a plate having an opening connected to said housing, said opening being used to provide a path for feeding said document holder into said apparatus.

5. The apparatus of claim 1, further comprises document holder rejecting means for rejecting said document holder.

6. The apparatus of claim 1, wherein said cover is a memory alloy.

7. The apparatus of claim 1, wherein said cover is a plastic slice.

8. The apparatus of claim 1, wherein said transparent plate is made of glass.

9. The apparatus of claim 1, wherein said transparent plate is made of acrylic resin.

10. The apparatus of claim 1, wherein said image capturing means is contact image sensor (CIS).

11. The apparatus of claim 1, wherein said image capturing means is charge couple device (CCD).

12. An apparatus for scanning, said apparatus comprising:

a housing for providing space for holding elements of said apparatus;

driving means for driving said image capturing means to move back and forth;

a pair of tracks respectively formed on said housing for holding said document holder and providing an orbit such that said document holder linearly moves along said tracks back and forth;

a document holder having document covering means, a transparent plate for holding a document, wherein said document covering means includes a rotatable rod set in said housing, a cover for covering said document, one end of said cover being fixed on said transparent plate, another end of said cover being adhered on said rotatable rod, said cover being movable between a retracted position in which the cover is wound around the rotatable rod, and a deployed position wherein the cover is unwound from around said rotatable rod; and means for capturing set in said apparatus for capturing the image of said document.

13. The apparatus of claim 12, wherein said cover is a memory alloy.

14. The apparatus of claim 12, wherein said cover is a plastic slice.

15. The apparatus of claim 12, wherein said transparent plate is made of glass.

16. The apparatus of claim 12, wherein said transparent plate is made of acrylic resin.

17. The apparatus of claim 12, wherein said image capturing means is contact image sensor (CIS).

18. The apparatus of claim 12, wherein said image capturing means is charge couple device (CCD).

* * * * *